United States Patent [19]

Brown

[11] 4,165,007

[45] Aug. 21, 1979

[54] APPARATUS FOR SECURING REMOVABLE CONTAINERS TO VEHICLE PLATFORMS

[75] Inventor: Douglas S. Brown, Knoxville, Tenn.

[73] Assignee: Carrier Corporation, Syracuse, N.Y.

[21] Appl. No.: 857,057

[22] Filed: Dec. 5, 1977

[51] Int. Cl.$^2$ .............................................. B65J 1/22
[52] U.S. Cl. ................................ 414/494; 105/366 A; 105/366 C; 414/500
[58] Field of Search ................... 214/505, 516, 517; 105/366 A, 366 B, 366 C, 463, 464, 465, 381, 391; 296/35 A; 280/145

[56] References Cited

U.S. PATENT DOCUMENTS

| | | | |
|---|---|---|---|
| 1,260,179 | 3/1918 | Fry | 280/145 |
| 3,107,020 | 10/1963 | Dempster et al. | 214/505 |
| 3,641,940 | 2/1972 | Evans | 105/366 C X |
| 3,897,882 | 8/1975 | Budoff | 214/517 |

Primary Examiner—Robert G. Sheridan
Attorney, Agent, or Firm—J. Raymond Curtin; John S. Sensny

[57] ABSTRACT

A vehicle frame for supporting large removable containers. One or more container securing members are attached to the frame. Each securing member can move between an inoperative or resting position and an operative or securing position. In the inoperative position, the securing member does not interfere with the loading, transporting, or unloading of a removable container. In the operative position, the securing member can engage a cooperating member of the container to secure the container to the frame. Lock means are associated with each securing member to prevent the member from inadvertently moving from the operative position to the resting position.

5 Claims, 5 Drawing Figures

APPARATUS FOR SECURING REMOVABLE CONTAINERS TO VEHICLE PLATFORMS

BACKGROUND OF THE INVENTION

This invention relates to platforms for removable containers, and more particularly to apparatus for securing large removable containers to such platforms.

Large containers of many sizes and types are often used to transport various kinds of loads. For example, these containers may be used to carry compacted refuse away from a stationary refuse compactor, or they may be used to haul debris away from the site of a major construction project. Generally, the containers can be filled when sitting on the ground, floor, or other surface, loaded onto a vehicle such as a truck or a railroad car, transported to a remote point, unloaded from the vehicle, and then emptied. These containers may be of extremely large size. For example, a large refuse container may measure over 20 feet in length and may hold up to 45 cubic yards of material.

Vehicles of the type shown in U.S. Pat. No. 3,107,020, granted to George R. Dempster et al on Oct. 15, 1963, that transport these containers have a container support platform or tilting frame pivotally secured to the rear portion of the vehicle chassis. The tilting frame can pivot between a travel position and a tipped position, and these vehicles have a pair of hydraulic cylinders pivotally secured to both the chassis and the tilting frame for pivoting the frame between the travel and tipped positions. In the travel position, the tilting frame is generally horizontal and is resting on the chassis of the vehicle. In the tipped position, the tilting frame slopes downward toward the ground with the back end of the tilting frame in contact with the ground. Commonly, the tilting frame will have a cable and cable drawing means such as an electric powered winch drum or a hydraulic cylinder. One end of the cable is free, and the cable drawing means can be employed to draw the free end of the cable towards the front end of the tilting frame.

To pick up a container, the tilting frame is pivoted to the tipped position and the free end of the cable is attached to the end of the container closest to the vehicle. The cable is then drawn in and the container is pulled up onto the sloping frame. The tilting frame includes guide rails positioned longitudinally across the frame. These guide rails cooperate with longitudinal members of the container undercarriage to insure that, as the container is pulled onto the tilting frame, the longitudinal axes of the frame and the container are in general alignment. After the container is on the tilting frame, the frame is returned to its travel position so that the container will be in a horizontal position as it is transported by the vehicle to another location. To unload the container, the tilting frame is again pivoted to the tipped position and the free end of the cable is lowered toward the ground so that the container slides down the frame to the ground.

It is desirable to carry a container in a position which distributes the weight of the container approximately equally between the axles supporting the tilting frame. This prolongs the life of the axles reducing the cost of maintaining the vehicle. Also, distributing the container's weight equally among the axles permits that weight to be distributed evenly among the road wheels supporting the tilting frame. This extends the useful life of the wheels further reducing the cost of maintaining the vehicle. The weight of the container is usually sufficient to hold the container in place on the tilting frame. However, securing devices are often used to insure against any undesired movement of the container.

The problem of securing a container to the tilting frame is complicated by the fact that various sizes and types of containers involving numerous structural designs are in common use. The multiplicity of structural designs makes it difficult to develop a single securing device that can be used interchangeably with the different containers. In the past, a variety of clamping devices and procedures have been used to secure containers to the tilting frame. Such procedures, though, are subject to operator error and are time consuming. Also, these procedures often utilize clamping mechanisms having numerous removable parts. These parts are frequently lost, mislaid, or damaged while removed from the clamping mechanism. The bother of continuously clamping and unclamping containers and the risk of loss or damage to the removable parts make these clamping procedures unsatisfactory.

SUMMARY OF THE INVENTION

An object of this invention is to improve vehicles that transport removable containers.

Another object of this invention is to provide a vehicle tilting frame that can securely hold and support any one of a variety of sizes and types of containers in a position that distributes the weight of the container approximately equally between the axles supporting the frame.

A further object of this invention is to improve apparatus for securing removable containers to vehicle tilting frames.

A still further object of this invention is to provide a vehicle tilting frame with a securing member that can move between an operative container securing position and an inoperative position in which the securing member does not interfere with a container resting on, being loaded onto, or being unloaded from the tilting frame.

These and other objectives are attained in a tilting frame having a securing apparatus that includes a securing member pivotally connected to the tilting frame for movement between an operative, container securing position and an inoperative, resting position. In the operative position, the securing member can engage a cooperating member of a removable container to restrain the container from movement relative to the tilting frame. In the inoperative position, the securing member is below the top of the tilting frame and does not interfere with a removable container resting on, being loaded onto, or being unloaded from the tilting frame. A lock bar is provided to preclude the securing member from inadvertently moving from the operative position to the inoperative position. The lock bar is pivotally connected to the securing member for movement between a locked position and an unlocked position. According to one embodiment of the invention, the lock bar is positioned on the inside of the securing member and a pressure pad or contact element is secured to the lock bar. When the securing member is in the operative position and the lock bar is in the locked position, the lock bar, the pressure pad, and the tilting frame cooperate to hold the securing member in the operative position. According to a second embodiment of the invention, the lock bar is positioned on the outside of the securing member and a stop is provided which, when the securing member is in the operative position and the lock bar is in the locked position, cooperates with the lock bar to prevent the securing member from moving out of the operative position. In both embodiments, when the lock bar is in an unlocked position, the securing member is free to pivot between the operative position and the inoperative position.

To move the securing member from the inoperative position to the operative position, the lock bar is maintained in an unlocked position and the securing member is simply swung into place. Then the lock bar is allowed to fall into the locked position, locking the securing member into the operative position. This entire procedure is quick and simple. Also, no removable or detachable parts are used eliminating the risk that an element will be lost, mislaid, or damaged while removed.

A tilting frame having a plurality of such securing members, each designed for use with a different size container, can securely hold one size container at one time, a second size container at a different time, and so on, simply by moving the various securing members between the operative and the inoperative positions. The securing members can be located so that each container is held in a position which distributes the weight of the container approximately equally between the axles supporting the tilting frame.

Further benefits and advantages of the invention will become apparent from a consideration of the following description given with reference to the accompanying drawings which specify and show a preferred embodiment of the invention.

A DETAILED DESCRIPTION OF A PREFERRED EMBODIMENT

Figure 1:
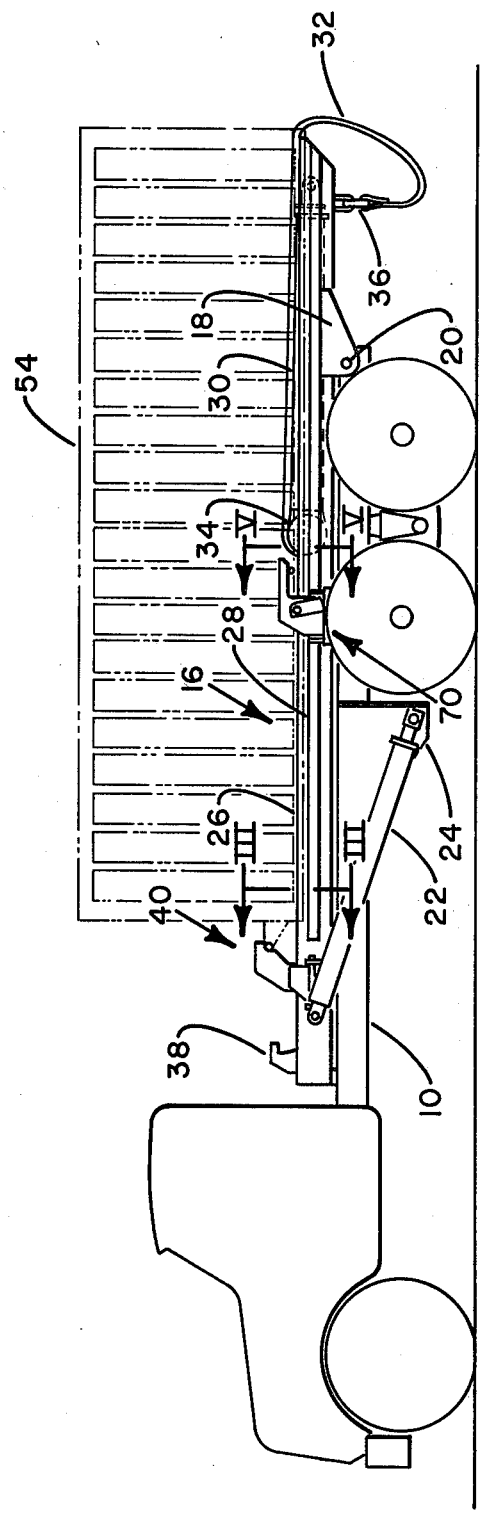
FIG. 1 is a side view of a removable container, a vehicle, and a tilting frame that utilizes the teaching of the present invention.

Referring to the drawings in detail, FIG. 1 depicts a vehicle chassis 10 of conventional form that can be driven by a suitable source of power (not shown) under the control of an operator. The chassis 10 is of sufficient length to accommodate a large removable container 54. A container platform or tilting frame 16 is mounted on the vehicle chassis 10 and extends throughout the major portion of the length of the chassis. A pair of rear support brackets 18 are secured to the sides of the tilting frame 16 towards the rear of the tilting frame. These brackets 18 are pivotally mounted on a journal rod or pivot member 20 which is rotatably supported by the chassis 10. The tilting frame 16 is pivoted about the journal rod 20 by a pair of hydraulic cylinders 22. One cylinder 22 is positioned on each side of the chassis 10, and each cylinder is pivotally connected to both the tilting frame 16 and a front bracket 24, which is secured to the chassis 10. Extension of the piston rods of the hydraulic cylinders 22 pivots the tilting frame 16 from the travel position shown in FIG. 1 to a tipped position wherein the front of the frame is elevated and the rear of the frame drops down toward the ground.

The tilting frame 16 also includes two parallel guide rails 26 that extend lengthwise of the frame. The guide rails 26 cooperate with longitudinal frame members of the undercarriage of a removable container to guide the container as it is pulled onto the tilting frame 16. In addition, a longitudinal container support member 28 is provided on either side of the frame 16 to provide support for certain types of removable containers. A hydraulic cylinder 30 is mounted on the tilting frame 16 for longitudinal movement along the frame. A cable 32 has one end secured to the tilting frame 16 rearward of the front end of the hydraulic cylinder 30. The cable 32 extends forward around a sheave 34 mounted on the front of the hydraulic cylinder 30 and then rearward to the back of the tilting frame 16. A hook 36 adapted to engage a container is secured to the free end of the cable 32.

To load a container onto the vehicle, the tilting frame 16 is pivoted to its tipped position by an outward movement of the piston rods of the hydraulic cylinders 22. The hook 36 is connected to the bottom front of the container and the container is drawn onto the tilting frame by an extension of the piston rod of the hydraulic cylinder 30. Once the container is on the tilting frame 16, the frame is returned to its normal or travel position by an inward movement of the piston rods of the hydraulic cylinders 22. To unload a container, the tilting frame 16 is pivoted to its tipped position, and the piston rod of the hydraulic cylinder 30 is retracted allowing the container to slide off the platform to the ground.

Figure 2:
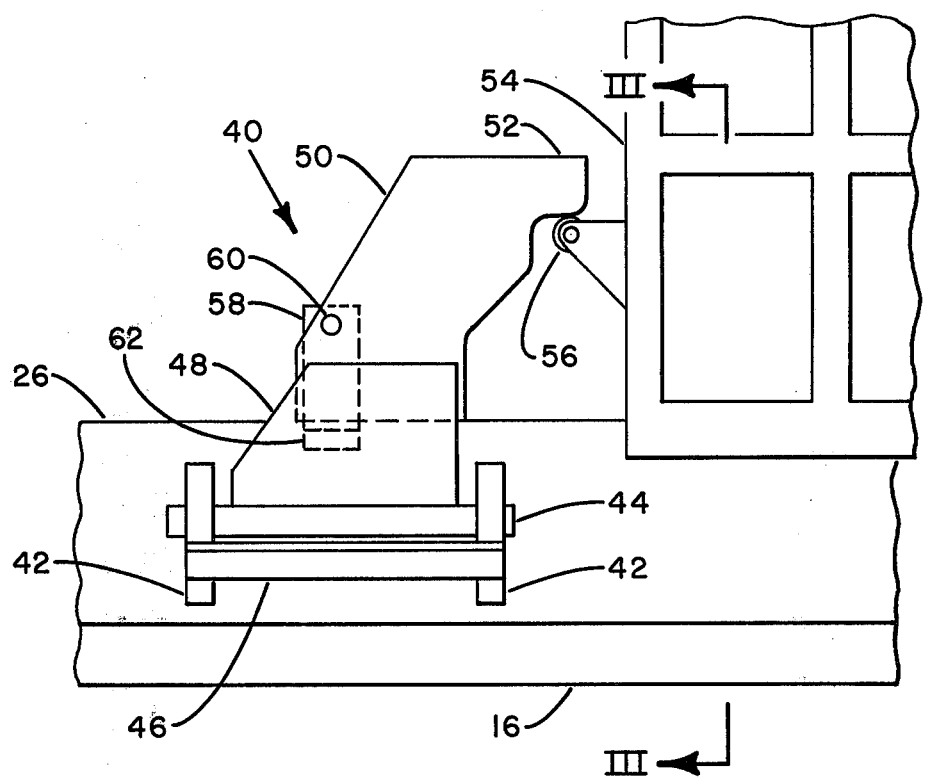
FIG. 2 is an enlarged view of a portion of the tilting frame and container of FIG. 1 showing in greater detail the securing apparatus that engages the front of the container.
Figure 3:
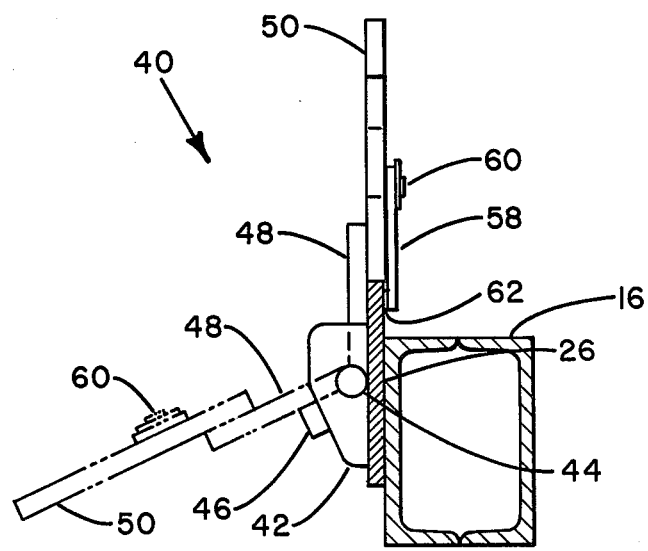
FIG. 3 is a rear view of the securing apparatus and the tilting frame taken along line III—III of FIG. 2 and showing the tilting frame in cross section.

A pair of spaced stationary front locks 38 are mounted on the tilting frame 16 near the front end of the frame, and are designed for use with containers that extend the length of the tilting frame. A second set of securing apparatus, designated generally as 40, are mounted on the tilting frame 16, and one securing apparatus 40 is mounted on each side of the tilting frame. Each apparatus 40 is secured to a guide rail 26 near the front of the frame 16, forward of the front end of the longitudinal container support member 28. As best seen in FIGS. 2 and 3, the securing apparatus 40 includes a pair of brackets 42 secured to the guide rail 26, a rod 44 rotatably supported by these brackets, and a support block or stop 46 rigidly secured to the brackets 42. One edge of a plate 48 is secured to the rod 44 parallel to the axis of the rod so that the plate and the rod are rotatable in brackets 42. A securing member 50 is secured to the inside face of the plate 48. The plate 48 and the securing member 50 can pivot about the axis of the rod 44 between an inoperative position, shown in broken lines in FIG. 3, and an operative or securing position, shown in full lines in FIGS. 1, 2, and 3. In the inoperative position, the plate 48 is in contact with and is supported by the stop 46, and the entire apparatus 40 is below the top of the guide rail 26. The securing apparatus 40 does not interfere with a removable container either resting on, being loaded onto, or being unloaded from the tilting frame 16. In the operative or securing position, both the plate 48 and the securing member 50 are generally vertical. The inside face of the plate 48 is flush with and abuts against the outside surface of the guide rail 26.

The securing member 50 is directly above the guide rail 26 inwardly of the rod 44. The securing member 50 tends to rotate by its own weight clockwise, as seen in FIG. 3, about the rod 44. Thus, the securing member 50 will not fall under its own weight to the inoperative position.

Referring to FIG. 2, the securing member 50 includes a rearward projection 52. When the plate 48 and the securing member 50 are in the upright or operative position, the projection 52 is located so that, as a container 54 moves forward on the platform 16, a crossbar 56 that is secured to the front of the container and which extends transverse of the container engages the projection 52 and slides under the projection. The crossbar 56 continues to slide under the projection 52 until the crossbar strikes the body of the securing member 50. When this occurs, the securing member 50 restrains the container 54 from forward and vertical movement with respect to the tilting frame 16.

A lock bar 58 is provided to insure that the securing member 50 does not inadvertently move while it is in the operative position. The lock bar 58 is generally rectangular in shape with one end rotatably connected to the securing member 50 by a pin 60. A pressure pad or contact element 62 is secured to the opposite, free end of the lock bar. Also, the lock bar 58 is weighted so that there is a tendency for the free end of the lock bar to rotate downward about pin 60.

As best shown in FIG. 2, the lock bar 58 is located so that, when the securing member 50 is in the operative position, the lock bar can pivot about the pin 60 to a position in which the free end of the lock bar and the contact element 62 are lower than the top of the guide rail 26. This position of the lock bar 58 is referred to as the locked position. In this position, the contact element 62, the lock bar 58, and the guide rail 26 cooperate to prevent the securing member 50 from rotating counterclockwise, as seen in FIG. 3, about the rod 44 out of the operative position. To move the lock bar 58 out of the locked position, the bottom of the lock bar is swung to the left as viewed in FIG. 2 about the pin 60 until the free end of the lock bar and the contact element 62 are higher than the top of the guide rail 26. This position of the lock bar 58 is referred to as an unlocked position. When the lock bar 58 is in an unlocked position, the securing member 50 is free to rotate about rod 44 between the operative and inoperative positions. In a preferred embodiment, the lock bar 58 is placed near the front edge of the securing member 50 so that the contact element 62 does not contact the securing member as the lock bar pivots between the locked position and the above described unlocked position. This arrangement is preferred because it reduces the wear on the contact element 62 and increases the ease with which the lock bar 58 can be swung from the locked position to an unlocked position.

To move the securing member 50 from the inoperative position, shown in broken lines in FIG. 3, to the operative or securing position, shown in full lines in FIGS. 1, 2, and 3, the lock bar 58 is held so that it will not contact the guide rail 26 as the securing member 50 is pivoted toward the guide rail. Then the plate 48 and the securing member 50 are manually pivoted about the axis of rod 44 until the inside face of the plate 48 comes into contact with the outside face of the guide rail 26. Then the lock bar 58 is released and allowed to rotate about pin 60 into the locked position. When the securing member 50 is in the operative position and the lock bar 58 extends downward below the guide rail 26, as best shown in FIGS. 2 and 3, the weight of the lock bar is sufficient to prevent the lock bar from inadvertently rotating about pin 60 out of the locked position. The contact element 62 is designed to frictionally engage the guide rail 26 as the lock bar swings into the locked position. This friction restrains the lock bar 58, further insuring that the lock bar does not accidentally move out of the locked position.

Figure 4:
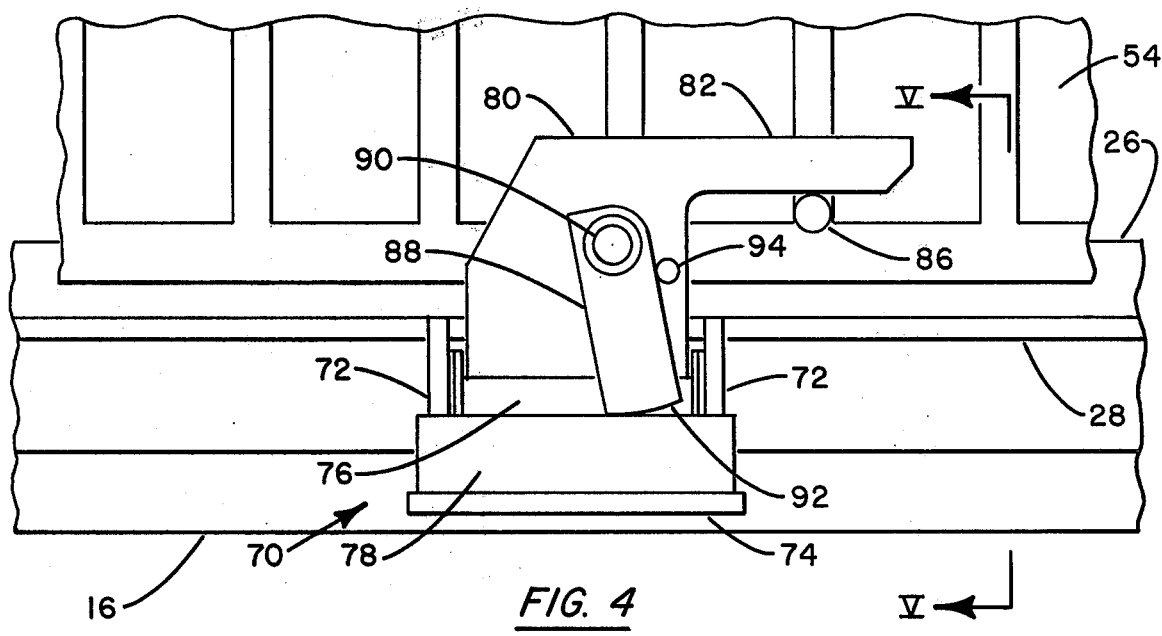
FIG. 4 is an enlarged side view of a portion of the tilting frame and container of FIG. 1 showing in greater detail the securing apparatus that engages the side of the container.
Figure 5:
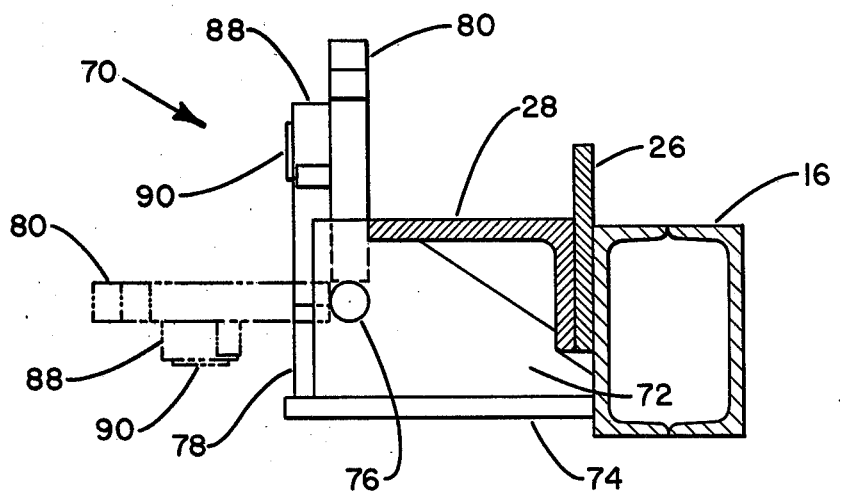
FIG. 5 is a rear view of the securing apparatus and the tilting frame taken along line V—V of FIG. 4 and showing the tilting frame in cross section.

Referring to FIG. 1, a third set of securing apparatus, designated generally as 70, are also mounted on the tilting frame 16, one on each side of the frame. While the securing apparatus 40 is designed to be attached to the tilting frame 16 at a position that is forward of the front end of the longitudinal container support member 28, the securing apparatus 70 is adapted to be joined to the tilting frame 16 at a position which is rearward of the front end of the longitudinal container support member and on the side thereof. As best seen in FIGS. 4 and 5, the securing apparatus 70 includes a pair of brackets 72 which are rigidly secured to the longitudinal container support member 28. The apparatus 70 also includes a bottom plate 74 and a support block or stop plate 78 both of which extend between and are secured to the brackets 72. A securing member 80 is secured to a rod 76, parallel to the axis of the rod. The rod 76 is rotatably mounted in the brackets 72. The securing member 80, thus, rotates with the rod 76 between an inoperative position, shown in broken lines in FIG. 5, and an operative or container securing position, shown in full lines in FIGS. 1, 4, and 5.

In the inoperative position, the securing member 80 is in contact with and is supported by the stop plate 78. In this position, the entire securing apparatus 70 is below the top of the guide rail 26 and does not interfere with a removable container resting on, being loaded onto, or being unloaded from the tilting frame 16. In the operative position, the securing member 80 is generally vertical or upright and the inside face of the securing member is in contact with the outside edge of the longitudinal container support member 28.

Referring to FIG. 4, the portion of the securing member 80 that faces the rear of the tilting frame 16 contains an extension 82. When the securing member 80 is in the upright or operative position, the extension 82 is positioned so that, as the container 54 moves forward on the platform 16, an outwardly extending pin 86 secured to the side of the container 54 near the bottom of the container slides under the extension until it contacts the main body of the securing member 80. When this occurs, the securing member 80 restrains the container 54 from movement with respect to the tilting frame 16.

A lock bar 88 is provided to hold the securing member 80 in the operative position. The lock bar 88 is generally rectangular in shape with one end of the lock bar rotatably connected to the securing member 80 by a pin 90. The opposite, free end of the lock bar 88 is slightly tapered or rounded, and is referenced as 92 in the drawings. The lock bar 88 is weighted, or the pin 90 may be mounted off center, so that there is a tendency for the rounded edge 92 of the lock bar to rotate downward, counterclockwise as seen in FIG. 4, about pin 90. When the securing member 80 is in the upright or operative position, the distance from the center of pin 90 to the rounded transverse edge 92 of the lock bar 88 is equal to or slightly less than the distance from the center of pin 90 to the stop plate 78. Thus, the lock bar 88 can pivot about pin 90 and the rounded edge 92 can come into contact with the stop plate 78 without the edge 92 binding against the surface of the stop plate 78.

In order to move the securing member 80 from the inoperative position to the operative position, the securing member 80 is manually pivoted upward about the axis of the rod 76 into contact with the outside edge of the support member 28. As this occurs, the lock bar 88 rotates downward about pin 90 so that the rounded edge 92 of this lock bar comes into contact with the top of the stop plate 78. Once in this position, the weight of the lock bar 88 is sufficient to prevent the lock bar from inadvertently rotating about pin 90. In order to further assure that the lock bar 88 does not accidentally move out of position, the lock bar can be further rotated until the lock bar contacts a stop pin 94 which is secured to the securing member 80 rearward of and below the pin 90. The lock bar 88 is then tightly wedged against the top of the stop plate 78. To move the securing member 80 from the operative position to the inoperative position, the lock bar 88 is manually swung clockwise about pin 90 as viewed in FIG. 4 and the securing member 80 is then rotated about the rod 76 until it comes into contact with the stop plate 78.

When the securing members 50 and 80 described above are in the inoperative position, they do not interfere with a container resting on, being loaded onto, or being removed from the tilting frame 16. Thus, a different set of securing mechanisms can be attached to the tilting frame 16 for each type of removable container that will be loaded onto the frame. Each set of securing members can be designed especially for use with a particular container. Before a container is loaded onto the platform 16, the securing members adapted for use with that container are pivoted to the operative position and locked into place. Then the container is loaded, transported, and unloaded. During this time the other securing members are kept in their inoperative position so that they do not interfere with the loading, transporting, or unloading of the container.

While the invention as described herein is utilized with a tilting frame 16 which is pivotally secured to a chassis 10 of a motor vehicle, it should be understood that the teaching of the present invention is applicable generally to platforms or frames for removable containers and may also be used, for example, with railroad car platforms.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

What is claimed is:

1. In a vehicle of the type used to load and transport individual containers of various sizes by pivoting a longitudinally extending tilting frame upward about the rear of the vehicle, drawing a container onto the frame along guide rails which limit container movement transverse to the tilting frame, and pivoting the tilting frame downward whereby the container rests on the tilting frame, apparatus for securing containers to the tilting frame including, a securing member for engaging a container resting on the tilting frame and limiting container movement longitudinally along the tilting frame, means for pivotally connecting the securing member to the tilting frame for movement transverse thereto between an inoperative position, wherein the securing member is below the top of the tilting frame so that the securing member does not interfere with the loading, transporting, and unloading of a container, and an operative position, wherein the securing member extends above the top of the tilting frame for engagement with a container resting on the tilting frame, and locking means for locking the securing member into the operative position, including a lock bar connected to the securing member for movement between a locked position and an unlocked position wherein the securing member is movable transverse to the tilting frame, the lock bar being connected to the securing member so that when the securing member is in the operative position, the lock bar will swing downward by its own weight into the locked position, and means for engaging the lock bar when the lock bar is in the locked position wherein contact between the lock bar and the engaging means prevents movement of the securing member transverse to the tilting frame.

2. The securing apparatus of claim 1 wherein, the engaging means includes a guide rail of the tilting frame, and the lock bar includes a contact element mounted on a side thereof for frictionally engaging the guide rail to restrain the lock bar from movement.

3. The securing apparatus of claim 2 wherein the contact element does not contact the securing member as the lock bar moves into the locked position.

4. The securing apparatus of claim 1 wherein, the engaging means includes a stop plate supported by the connecting means and positioned below the lock bar when the securing member is in the operative position, and a first end of the lock bar is rounded to facilitate movement of the lock bar into engagement with the stop plate.

5. The securing apparatus of claim 4 further including a stop pin attached to the securing member to limit movement of the lock bar beyond the position at which the rounded end of the lock bar engages the stop plate.

* * * * *